United States Patent [19]
Boffito et al.

[11] Patent Number: 5,678,724
[45] Date of Patent: Oct. 21, 1997

[54] GETTER MATERIALS FOR THE VACUUM INSULATION OF LIQUID HYDROGEN STORAGE VESSELS OR TRANSPORT LINES

[75] Inventors: Claudio Boffito; Fabrizio Doni; Bruno Ferrario, all of Milan, Italy

[73] Assignee: Saes Getters, S.p.A., Milan, Italy

[21] Appl. No.: 460,541

[22] Filed: Jun. 2, 1995

Related U.S. Application Data

[62] Division of Ser. No. 223,134, Apr. 5, 1994, Pat. No. 5,543,121, which is a continuation of Ser. No. 459,194, Dec. 29, 1989, abandoned.

[30] Foreign Application Priority Data

Jan. 24, 1989 [IT] Italy .................................. 19157/89

[51] Int. Cl.[6] ............................................. B65D 90/04
[52] U.S. Cl. ............................................. 220/421; 138/149
[58] Field of Search ............................. 138/149; 60/50.7; 220/420, 421, 426, 469

[56] References Cited

U.S. PATENT DOCUMENTS

| | | |
|---|---|---|
| 3,114,469 | 12/1963 | Francis et al. . |
| 3,130,555 | 4/1964 | Haettinger . |
| 3,137,143 | 6/1964 | Jacobs et al. . |
| 3,383,875 | 5/1968 | Haas . |
| 3,715,265 | 2/1973 | Allen et al. ............... 161/125 |
| 3,961,897 | 6/1976 | Giorgi et al. . |
| 4,036,617 | 7/1977 | Leonard et al. ............... 62/55 |
| 4,312,669 | 1/1982 | Boffito et al. . |
| 4,546,798 | 10/1985 | Porta . |
| 4,606,196 | 8/1986 | Acharya et al. . |
| 4,667,390 | 5/1987 | Acharya et al. . |
| 4,996,002 | 2/1991 | Sandrock et al. . |

*Primary Examiner*—Stephen J. Castellano
*Attorney, Agent, or Firm*—Hickman Beyer & Weaver

[57] ABSTRACT

A getter material is provided which efficiently sorbs gases at low pressures but, when a system failure causes high pressures of hydrogen and oxygen (air) to be present, does not increase its temperature to that which would cause explosive ignition of the hydrogen-oxygen (air) mixture.

6 Claims, 2 Drawing Sheets

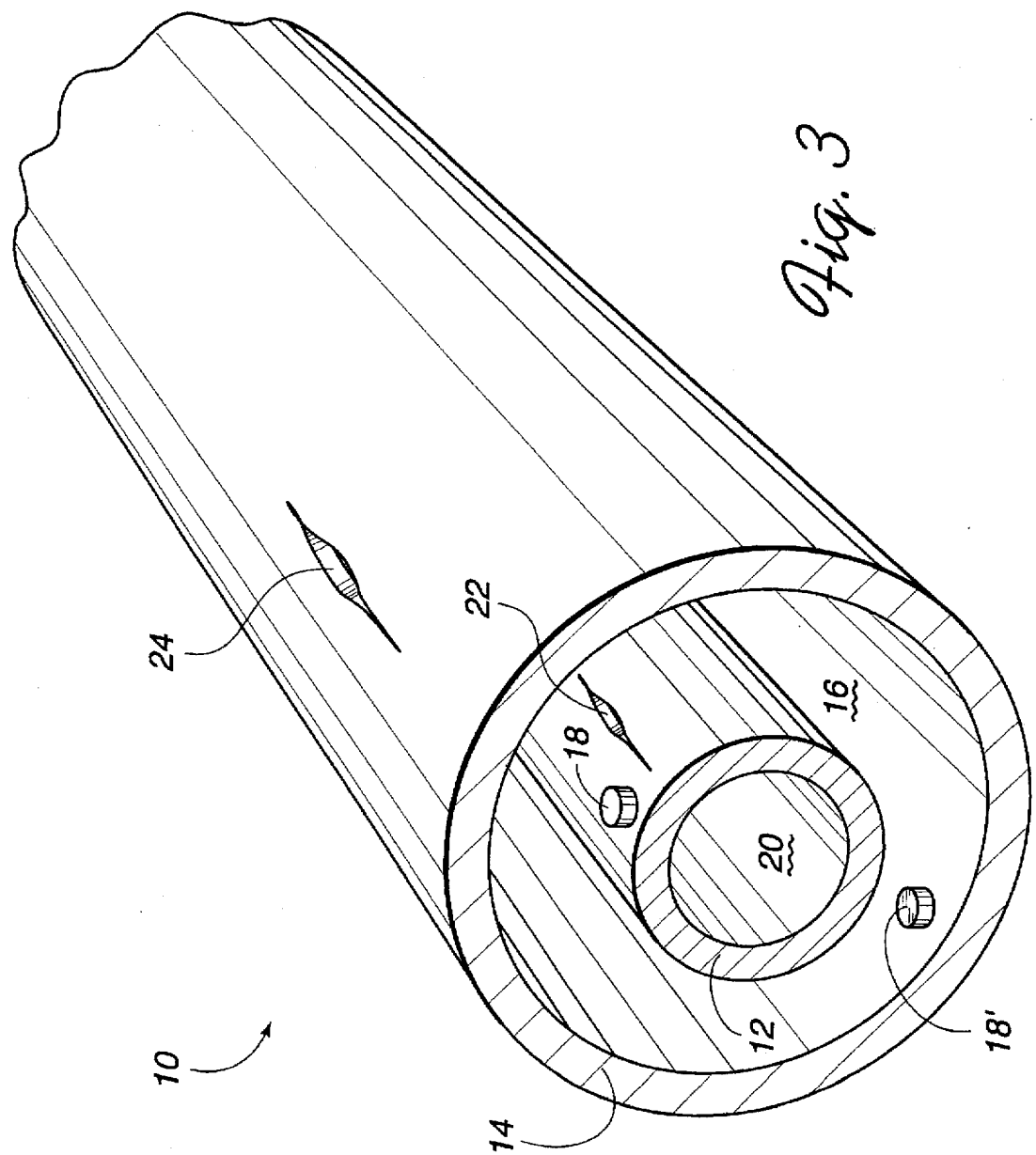

GETTER MATERIALS FOR THE VACUUM INSULATION OF LIQUID HYDROGEN STORAGE VESSELS OR TRANSPORT LINES

This is a divisional of application Ser. No. 08/233,134 filed on Apr. 5, 1994, now U.S. Pat. No. 5,543,121, which is a continuation of Ser. No. 07/459,194 filed on Dec. 29, 1989 now abandoned.

BACKGROUND TO THE INVENTION

Cryogenic fluids such as a liquid He, $O_2$, $N_2$ and $H_2$ are in widespread use. As far as possible they are surrounded by an insulating means to ensure that there is little transfer of heat into the cryogenic fluid. Francis et al. in U.S. Pat. No. 3,114,469 describe the thermal insulation of a cryogenic fluid storage container or Dewar. Porta (sic.: della Porta) in U.S. Pat. No. 4,546,798 and Schippl in UK Patent Application GB 2 139 311 A describe thermally insulated fluid transport pipes. In all these cases the thermal insulation is provided by means of a vacuum. Furthermore, in order to prevent degradation of the vacuum and hence loss of thermal insulation, it is customary to use a getter material within the evacuated space. This getter material serves to continuously sorb gases which are slowly released from the walls surrounding the vacuum space or from other components such as the known "superinsulations" which may also be present within the vacuum space.

Many different getter materials are known and have been used to maintain a vacuum for the thermal insulation of cryogenic fluids. della Porta supra lists at least five different suitable getter material among which there is a family of Zr—V—Fe ternary alloys described in more detail in Boffito et al. U.S. Pat. No. 4,312,669. One of the alloys described by Boffito, namely the alloy having the composition by weight of 70% Zr-24.6% V-5.4% Fe has found particular acceptance for the use as a getter material to maintain the vacuum in the insulation of cryogenic fluids. This getter material is available in commerce under the tradename of St 707 from SAES GETTERS S.p.A., Milan, Italy. Its widespread acceptance is probably due to the fact that it can be activated at relatively low temperatures of 500° C. or less and still possesses a high gas pumping speed.

Unfortunately the use of such traditional getter materials has several disadvantages in the vacuum insulation of liquid hydrogen. Leaks may develop in the wall separating the vacuum insulation from the liquid hydrogen. In this case the liquid hydrogen evaporates and forms a relatively high pressure of hydrogen within the vacuum enclosure. This gaseous hydrogen reacts rapidly with the getter material due to its high gas pumping speed. As a consequence of this rapid chemical reaction the temperature of the getter material rapidly increases and may reach many hundreds of degrees centragrades. Simultaneously a leak may also occur in the wall which separates the vacuum insulation From the external atmosphere. This leak may be caused by the rapid increase in temperature of the getter itself or may occur for other reasons. Whatever the cause of an air leak into the vacuum enclosure there is formed an $H_2$—$O_2$ mixture. This $H_2$—$O_2$ mixture can react explosively on contact with the hot getter device with catastrophic consequences.

BRIEF OBJECTS OF THE PRESENT INVENTION

It is therefore an object of the present invention to provide a getter material free from one or more of the disadvantages of prior getter materials.

It is another object of the present invention to provide a getter material which when exposed to a high hydrogen pressure does not excessively increase its temperature.

It is yet a further object of the present invention to provide a getter material sorbing a plurality of gases at low pressure which, if exposed to high hydrogen pressure in the presence of oxygen does not increase its temperature to the ignition temperature of the $H_2$—$O_2$ mixture.

There is also provided a method of sorbing a plurality of gases at low pressures, by contacting the gases with a getter material which, if exposed to a high hydrogen pressure in the presence of oxygen does not increase his temperature to the ignition temperature of the $H_2$—$O_2$ mixture.

Additional objects and advantages of getter materials of the present invention will become apparent to those skilled in the art by reference to the following detailed description thereof and drawings wherein:

BRIEF DESCRIPTION OF THE DRAWINGS

FIG. 3 is a schematic representation of a device of the present invention for safely storing or transporting liquid hydrogen.

DETAILED DESCRIPTION OF THE INVENTION

Figure 1:
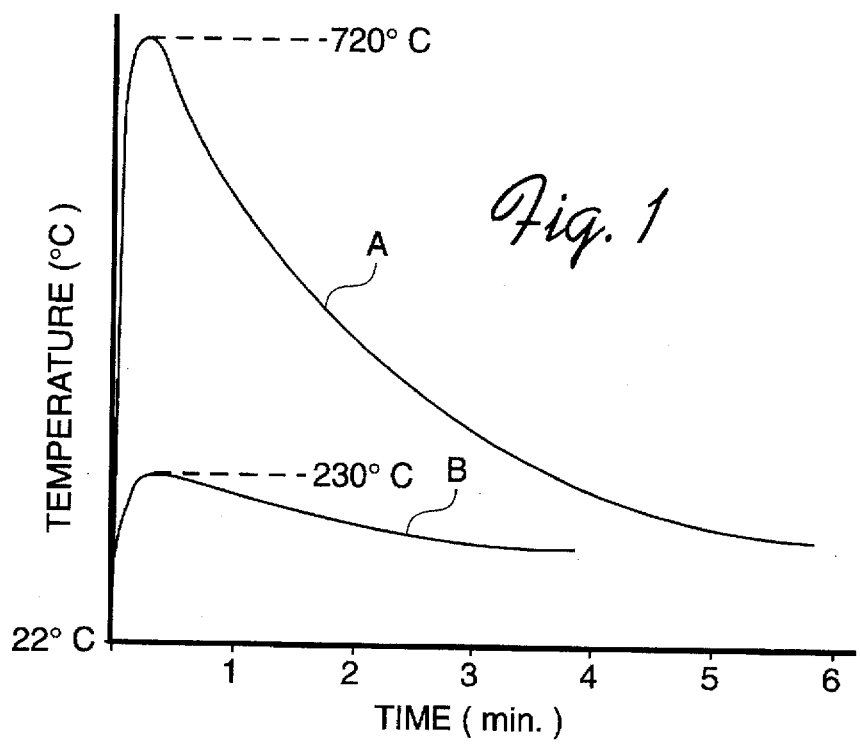
FIG. 1 is a graph showing the temperature reached by getter devices of the present invention during the sorption of hydrogen at relatively high pressures compared with the temperature reached by prior art getter devices under the same conditions.

The invention proceeds along the line of providing a getter material as an alloy having the formula:

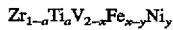

$$Zr_{1-a}Ti_aV_{2-x}Fe_{x-y}Ni_y$$

where
 a=0 to 0.3
 x=0.5 to 1.5
 y=0 to x.
Preferably y
 a=0
 x=1
 y=0 to 0.5.
Even more preferably
 a=0
 x=1
 y=0.

Surprisingly, it has been found that getter materials of the present invention when exposed to a high hydrogen pressure increase their temperature to a value less than that of the ignition temperature of $H_2$—$O_2$ mixtures. Furthermore the gettering characteristics towards other gases are only slightly reduced and remain sufficient to still act as a suitable getter material to maintain the vacuum in the insulation of liquid hydrogen.

EXAMPLE 1

A getter material was prepared having a composition $Zr_1V_1Fe_1$ (a=0, x=1 and y=0) by pressing the appropriate weight ratios of the individual components in a vacuum arc furnace. The arc furnace was back filled with argon to a pressure of between 400 and 500 mbar to produce an ingot of the ternary alloy. The ternary alloy was re-melted several times to ensure homogeneity. It was then ground to a powder size of less than approximately 125 μm. This powder was then mixed with approximately 5% by weight of aluminium powder having a powder size less than approximately 150 μm. The powder was then compressed into pills having a diameter of 6 mm and a height of 4 mm each containing about 550 mg of powder mixture.

EXAMPLE 2

This example is made for comparative purposes and uses the prior art getter device described in Boffito supra having a composition of 70% Zr-24.6% V-5.4% Fe. The getter material was again the form of compressed pills having an outside diameter of 6 mm and a height of 4 mm and a weight of approximately 630 mg.

EXAMPLE 3

This example is designed to show the increase in temperature of prior art getter devices when exposed to relatively high hydrogen pressures. 10 pills were placed in a cylindrical container together with a thermocouple and then placed in a volume of 0.6 . This volume was evacuated to a pressure of less than about $10^{-4}$ Torr. The getter were then heated to 500° C. for 10 minutes and allowed to cool to room temperature. The 0.6 l evacuated volume containing the 10 pills was then placed in contact with a second volume of 1.5 l filled with 514 mbar of hydrogen. The change in temperature of the prior art getter pills has a function of time is recorded as curve A of FIG. 1.

EXAMPLE 4

The test of Example 3 was repeated in exactly the same manner except that the getter pills were replaced with getter pills of the present invention as described in Example 1. The change in temperature of the getter devices of the present invention are recorded on FIG. 1 as curve B.

EXAMPLE 5

In order to show the hydrogen sorption properties of a prior art getter device sorption tests were performed according to ASTM Standard F798-82 using a getter device prepared according to Example 2. The gettter device was activated at 500° C. for 10 minutes and hydrogen sorption was performed at a getter temperature of 25° C. The hydrogen pressure was 3 times $10^{-6}$ mbar. The pumping speed is recorded as a quantity of hydrogen sorbed as curve 1 on FIG. 2.

EXAMPLE 6

The sorption tests of Example 5 were repeated at exactly the same conditions except that the getter device was replaced by a getter device of the present invention prepared according to Example 1. The pumping speed as a function of quantity of hydrogen sorbed is reported as curve 2 on FIG. 2.

EXAMPLE 7

Figure 2:
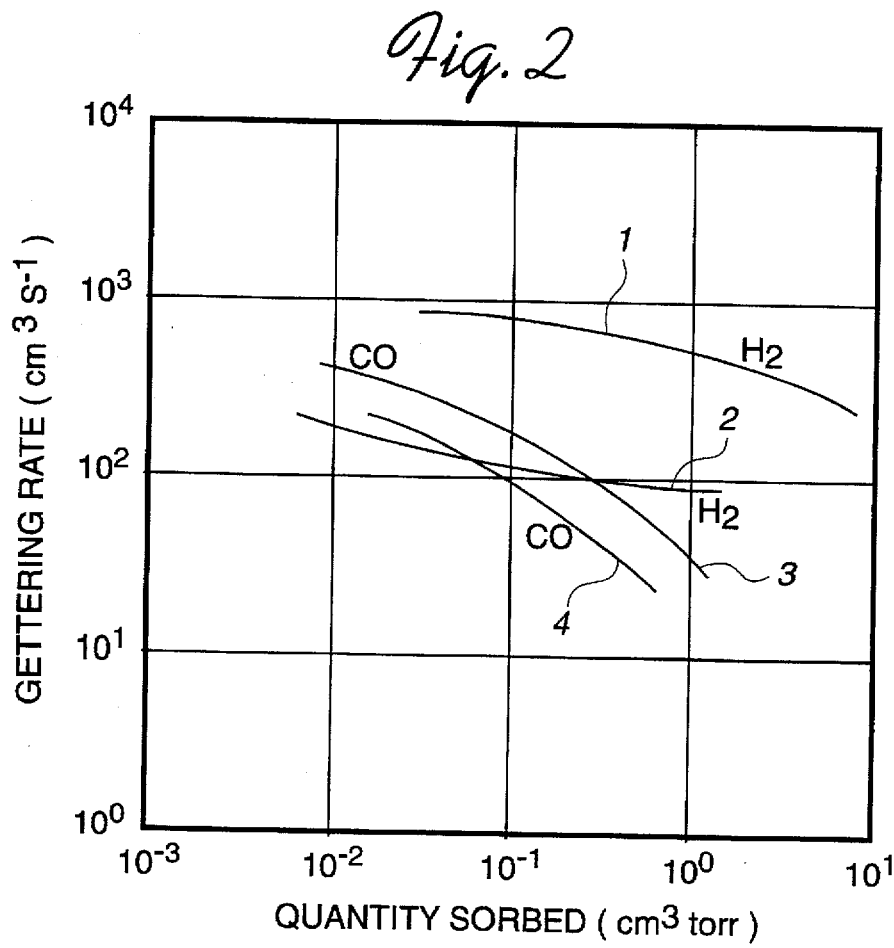
FIG. 2 shows the results of sorption tests relative to hydrogen and CO for the same types of getter as used for the construction of FIG. 1.

The sorption tests of Example 5 was repeated except that the gas used was CO and the curve is reported on FIG. 2 as curve 3.

EXAMPLE 8

Example 6 is repeated using exactly the same conditions except that the gas is replaced by CO and the curve is reported as curve 4 on FIG. 2.

DISCUSSION

As can be seen from FIG. 1 traditional Zr—V—Fe getter devices according to Boffito short an extremely high temperature increase to 720° C. when exposed to a high pressure of hydrogen (curve A) whereas getter devices of the present invention as shown by curve B of FIG. 1 reach a temperature of only 230° C. This temperature of 230° C. is much less than the spontaneous ignition temperature of an air hydrogen mixture which is approximately 570° C. Furthermore with reference to FIG. 2 although the hydrogen sorption speed has been reduced considerably by the use of getter materials of the present invention i.e., curve 2 with respect to curve 1 the sorption curves for other gases exemplified by curve 4 for CO of a getter material of the present invention is only slightly reduced with respect to that a prior art getter device has in curve 3.

Referring now to FIG. 3, there is shown a device 10 for storing or transporting liquid hydrogen. The device 10 comprises an inner conduit 12, an outer jacket 14, an intermediate zone 16 and a getter device 18 in the zone 16.

There is liquid hydrogen 20 within the conduit 12. Although the contrary is intended the inner conduit 12 has a leak 22. Liquid hydrogen 20 is able to escape through the leak 22 into the zone 16. As it escapes through the leak 22 it changes phase and becomes gaseous hydrogen.

The outer jacket 14 is spaced a distance from the inner conduit 12. Unfortunately the outer jacket 14 also has a leak 24.

In operation the zone 16 is intended to be at subatmospheric pressure. To achieve this the pressure in the zone 16 is reduced as low as possible by conventional pumping means. To attempt to ensure that this low subatmospheric pressure is maintained the zone 16 is provided with a getter device 18 and/or 18'. However as a practical matter sometimes there occurs in the zone 16, an explosive mixture of hydrogen and oxygen. The hydrogen is undesirably supplied to the zone 16 through the leak 22. The oxygen is undesirably supplied to the zone 16 by air passing through the leak 24 in the outer jacket 14.

Because of the unexpectedly low temperature reached by getter devices of the present invention the explosive mixture of hydrogen and oxygen in the zone 16 is not ignited by the getter device 18. This is not true of many prior getter devices which, when they sorb hydrogen, reach a temperature high enough to ignite the hydrogen.

Although the invention has been described in considerable detail with reference to certain preferred embodiments thereof, it will be understood that variations and modifications can be made without departing from the spirit and scope of the invention as described above and as defined in the appended claims.

We claim:

1. A device for safely storing or transporting liquid hydrogen, said device comprising:

A. an inner conduit configured to contain liquid hydrogen;
    B. an outer jacket spaced a distance from the inner conduit;
    C. said inner conduit and said outer jacket defining a zone intended to be at subatmospheric pressure and intended to be free of hydrogen gas;
    D. a getter device in the zone; said getter device including a mixture having a first component and a second component, said first component being aluminum of about 5% by weight of said mixture and said second component being a getter alloy which is an intermetallic compound if the formula; $Zr_1V_1Fe_1$.

2. The device of claim 1 wherein said getter alloy of said getter device consists of a powder of particle size less than about 125 μm.

3. The device of claim 2 wherein said aluminum of said getter device consists of a powder of particle size less than about 150 μm.

4. A device for safely storing or transporting liquid hydrogen, said device comprising:

A. an inner conduit configured to contain liquid hydrogen;

B. an outer jacket spaced a distance from the inner conduit;

C. said inner conduit and said outer jacket defining a zone intended to be at subatmospheric pressure and intended to be free of hydrogen gas;

D. a getter device in the zone; said getter device including a mixture having a first component and a second component, said first component being aluminum of about 5% by weight of said mixture and said second component being a getter alloy which is an intermetallic compound of the formula: $Z_1V_1Fe_1$, said getter device being capable of maintaining a temperature of less than 230° C. when said getter device is exposed to a mixture of hydrogen and oxygen gases thereby preventing ignition of said hydrogen and oxygen gas mixture.

5. The device of claim 4 wherein said getter alloy of said getter device consists of a powder of particle size less than about 125 μm.

6. The device of claim 5 wherein said aluminum of said getter device consists of a powder of particle size less than about 150 μm.

* * * * *